US008486580B2

(12) United States Patent
Tucker et al.

(10) Patent No.: US 8,486,580 B2
(45) Date of Patent: Jul. 16, 2013

(54) INTEGRATED SEAL FOR HIGH-TEMPERATURE ELECTROCHEMICAL DEVICE

(75) Inventors: Michael C. Tucker, Berkeley, CA (US); Craig P. Jacobson, Moraga, CA (US)

(73) Assignee: The Regents of the University of California, Oakland, CA (US)

( * ) Notice: Subject to any disclaimer, the term of this patent is extended or adjusted under 35 U.S.C. 154(b) by 251 days.

(21) Appl. No.: 12/988,297

(22) PCT Filed: Jun. 12, 2008

(86) PCT No.: PCT/US2008/066737
§ 371 (c)(1),
(2), (4) Date: Jan. 7, 2011

(87) PCT Pub. No.: WO2009/128849
PCT Pub. Date: Oct. 22, 2009

(65) Prior Publication Data
US 2011/0104586 A1    May 5, 2011

Related U.S. Application Data

(60) Provisional application No. 61/046,313, filed on Apr. 18, 2008.

(51) Int. Cl.
*H01M 4/00* (2006.01)
(52) U.S. Cl.
USPC .......................................... 429/508; 427/115
(58) Field of Classification Search
USPC ........................................ 429/508; 427/115
See application file for complete search history.

(56) References Cited

U.S. PATENT DOCUMENTS

| | | | |
|---|---|---|---|
| 3,126,311 | A | 3/1964 | Harris |
| 3,324,543 | A | 6/1967 | McVey et al. |
| 3,402,230 | A | 9/1968 | White |
| 3,525,646 | A | 8/1970 | Tannenberger et al. |
| 3,668,010 | A | 6/1972 | Falley et al. |
| 3,773,549 | A | 11/1973 | Elbert |

(Continued)

FOREIGN PATENT DOCUMENTS

| | | |
|---|---|---|
| CN | 1471741 | 1/2004 |
| CN | 1498877 A | 5/2004 |

(Continued)

OTHER PUBLICATIONS

U.S. Appl. No. 61/046,313, "Integrated seal for high-temperature electrochemical device", Tucker et al., filed Apr. 18, 2008.

(Continued)

*Primary Examiner* — Mark F Huff
*Assistant Examiner* — Monique Wills
(74) *Attorney, Agent, or Firm* — Weaver Austin Villeneuve & Sampson LLP

(57) ABSTRACT

The present invention provides electrochemical device structures having integrated seals, and methods of fabricating them. According to various embodiments the structures include a thin, supported electrolyte film with the electrolyte sealed to the support. The perimeter of the support is self-sealed during fabrication. The perimeter can then be independently sealed to a manifold or other device, e.g., via an external seal. According to various embodiments, the external seal does not contact the electrolyte, thereby eliminating the restrictions on the sealing method and materials imposed by sealing against the electrolyte.

18 Claims, 9 Drawing Sheets

U.S. PATENT DOCUMENTS

| | | | |
|---|---|---|---|
| 4,035,547 A | 7/1977 | Heller et al. | |
| 4,560,607 A | 12/1985 | Sumner | |
| 4,562,124 A | 12/1985 | Ruka | |
| 4,578,214 A | 3/1986 | Jungerhans | |
| 4,624,897 A | 11/1986 | Ito | |
| 4,687,717 A | 8/1987 | Kaun et al. | |
| 4,720,335 A | 1/1988 | Fukushima et al. | |
| 4,763,828 A | 8/1988 | Fukaya et al. | |
| 4,847,172 A | 7/1989 | Maskalick et al. | |
| 4,917,958 A | 4/1990 | Akai et al. | |
| 4,929,294 A | 5/1990 | Blome | |
| 4,942,999 A | 7/1990 | Oda et al. | |
| 5,013,612 A | 5/1991 | Hunt et al. | |
| 5,043,229 A | 8/1991 | Mizuhara | |
| 5,085,720 A | 2/1992 | Mikeska et al. | |
| 5,127,969 A | 7/1992 | Sekhar | |
| 5,173,372 A | 12/1992 | Matsuo et al. | |
| 5,236,787 A | 8/1993 | Grassi | |
| 5,240,480 A | 8/1993 | Thorogood et al. | |
| 5,279,909 A | 1/1994 | Horner et al. | |
| 5,306,411 A | 4/1994 | Mazanec et al. | |
| 5,318,951 A | 6/1994 | Shintaku et al. | |
| 5,328,779 A | 7/1994 | Tannenberger et al. | |
| 5,366,770 A | 11/1994 | Wang | |
| 5,409,784 A | 4/1995 | Bromberg et al. | |
| 5,441,825 A | 8/1995 | Barlow | |
| 5,480,739 A | 1/1996 | Kawasaki et al. | |
| 5,487,803 A | 1/1996 | Sweeney et al. | |
| 5,589,285 A | 12/1996 | Cable et al. | |
| 5,599,383 A | 2/1997 | Dyer et al. | |
| 5,616,223 A | 4/1997 | Shen et al. | |
| 5,626,914 A | 5/1997 | Ritland et al. | |
| 5,629,103 A | 5/1997 | Wersing et al. | |
| 5,633,081 A | 5/1997 | Cough et al. | |
| 5,670,270 A | 9/1997 | Wallin | |
| 5,672,848 A | 9/1997 | Komorita et al. | |
| 5,686,198 A | 11/1997 | Kuo et al. | |
| 5,735,332 A | 4/1998 | Ritland et al. | |
| 5,741,605 A | 4/1998 | Gillett et al. | |
| 5,750,279 A | 5/1998 | Carolan et al. | |
| 5,787,578 A | 8/1998 | Farooq et al. | |
| 5,827,620 A | 10/1998 | Kendall | |
| 5,908,713 A | 6/1999 | Ruka et al. | |
| 5,932,368 A | 8/1999 | Batawi et al. | |
| 5,938,822 A | 8/1999 | Chen et al. | |
| 5,976,216 A | 11/1999 | Samal et al. | |
| 5,993,986 A | 11/1999 | Wallin et al. | |
| 6,007,683 A | 12/1999 | Jankowski et al. | |
| 6,017,647 A | 1/2000 | Wallin | |
| 6,188,582 B1 | 2/2001 | Peter | |
| 6,217,732 B1 | 4/2001 | Schuh et al. | |
| 6,270,642 B1 | 8/2001 | Basu et al. | |
| 6,293,978 B2 | 9/2001 | Kleefisch et al. | |
| 6,296,910 B1 | 10/2001 | Choy et al. | |
| 6,344,291 B1 | 2/2002 | Hitomi | |
| 6,348,273 B1 | 2/2002 | Ishikawa et al. | |
| 6,358,567 B2 | 3/2002 | Pham et al. | |
| 6,368,383 B1 | 4/2002 | Virkar et al. | |
| 6,372,078 B1 | 4/2002 | Melchert et al. | |
| 6,390,354 B1 | 5/2002 | Makino et al. | |
| 6,420,064 B1 | 7/2002 | Ghosh et al. | |
| 6,428,920 B1 | 8/2002 | Badding et al. | |
| 6,440,578 B1 | 8/2002 | Shinkai et al. | |
| 6,492,050 B1 | 12/2002 | Sammes | |
| 6,541,146 B1 | 4/2003 | Xue et al. | |
| 6,565,621 B2 | 5/2003 | Shinkai et al. | |
| 6,576,363 B1 | 6/2003 | Hitomi | |
| 6,589,680 B1 | 7/2003 | Gorte et al. | |
| 6,605,316 B1 | 8/2003 | Visco et al. | |
| 6,653,009 B2 | 11/2003 | Wang et al. | |
| 6,656,625 B1 | 12/2003 | Thompson et al. | |
| 6,682,842 B1 | 1/2004 | Visco et al. | |
| 6,742,700 B2 | 6/2004 | Makino et al. | |
| 6,767,622 B2 | 7/2004 | Hada et al. | |
| 6,767,662 B2 | 7/2004 | Jacobson et al. | |
| 6,783,880 B2 | 8/2004 | Christiansen | |
| 6,800,323 B2 | 10/2004 | Pan | |
| 6,846,511 B2 | 1/2005 | Visco et al. | |
| 6,887,361 B1 | 5/2005 | Visco et al. | |
| 6,896,992 B2 | 5/2005 | Kearl | |
| 6,974,516 B2 | 12/2005 | Devoe et al. | |
| 6,979,511 B2 | 12/2005 | Visco et al. | |
| 6,994,884 B1 | 2/2006 | Guan et al. | |
| 7,055,733 B2 | 6/2006 | Weil et al. | |
| 7,118,777 B2 | 10/2006 | Visco et al. | |
| 7,153,559 B2 | 12/2006 | Ito et al. | |
| 7,163,713 B2 | 1/2007 | Jacobson et al. | |
| 7,208,246 B2 | 4/2007 | Herman et al. | |
| 7,218,502 B2 | 5/2007 | Fujii et al. | |
| 7,232,626 B2 | 6/2007 | Jacobson et al. | |
| 7,273,673 B2 | 9/2007 | Akikusa et al. | |
| 7,351,488 B2 | 4/2008 | Visco et al. | |
| 7,553,573 B2 | 6/2009 | Visco et al. | |
| 8,287,673 B2 | 10/2012 | Tucker et al. | |
| 8,343,686 B2 | 1/2013 | Tucker et al. | |
| 2001/0012576 A1 | 8/2001 | Christiansen et al. | |
| 2002/0028367 A1 | 3/2002 | Sammes et al. | |
| 2002/0048699 A1 | 4/2002 | Steele et al. | |
| 2002/0081762 A1 | 6/2002 | Jacobson et al. | |
| 2002/0177031 A1 | 11/2002 | Doshi et al. | |
| 2003/0021900 A1 | 1/2003 | Jacobson et al. | |
| 2003/0024611 A1 | 2/2003 | Cornie et al. | |
| 2003/0059668 A1 | 3/2003 | Visco et al. | |
| 2003/0132270 A1 | 7/2003 | Weil et al. | |
| 2003/0188637 A1 | 10/2003 | Ito et al. | |
| 2003/0224234 A1 | 12/2003 | Steele et al. | |
| 2004/0023101 A1 | 2/2004 | Jacobson et al. | |
| 2004/0028994 A1 | 2/2004 | Akikusa et al. | |
| 2004/0112478 A1 | 6/2004 | Bieler et al. | |
| 2004/0115416 A1 | 6/2004 | Nonninger et al. | |
| 2004/0135324 A1 | 7/2004 | Brule et al. | |
| 2004/0219423 A1 | 11/2004 | Tunney et al. | |
| 2004/0231143 A1 | 11/2004 | Visco et al. | |
| 2004/0240142 A1 | 12/2004 | Fujii et al. | |
| 2005/0000621 A1 | 1/2005 | Devoe et al. | |
| 2005/0022921 A1 | 2/2005 | Morrison et al. | |
| 2005/0037252 A1 | 2/2005 | Pham | |
| 2005/0048343 A1 | 3/2005 | Thirukkvalur | |
| 2005/0095479 A1 | 5/2005 | Mardilovich et al. | |
| 2005/0147857 A1 | 7/2005 | Crumm et al. | |
| 2005/0170234 A1 | 8/2005 | Liu et al. | |
| 2005/0214612 A1 | 9/2005 | Visco et al. | |
| 2005/0214616 A1 | 9/2005 | Kumar et al. | |
| 2005/0221153 A1 | 10/2005 | Sugimoto et al. | |
| 2005/0271931 A1 | 12/2005 | Finnerty | |
| 2006/0029860 A1 | 2/2006 | Ketcham et al. | |
| 2006/0051643 A1 | 3/2006 | Sarkar et al. | |
| 2006/0057295 A1 | 3/2006 | Visco et al. | |
| 2006/0119669 A1 | 6/2006 | Sharma et al. | |
| 2006/0153974 A1 | 7/2006 | Matsuzaki et al. | |
| 2006/0228615 A1 | 10/2006 | Armstrong et al. | |
| 2006/0234112 A1 | 10/2006 | Visco et al. | |
| 2007/0059576 A1 | 3/2007 | Jacobson et al. | |
| 2007/0117006 A1 | 5/2007 | Zhan et al. | |
| 2007/0148503 A1* | 6/2007 | Okazaki | 429/13 |
| 2007/0166603 A1 | 7/2007 | Nakanishi et al. | |
| 2008/0118804 A1 | 5/2008 | Tucker et al. | |
| 2008/0131723 A1 | 6/2008 | Tucker et al. | |
| 2008/0254335 A1 | 10/2008 | Torgerson et al. | |
| 2008/0268323 A1 | 10/2008 | Tucker et al. | |
| 2009/0148743 A1* | 6/2009 | Day et al. | 429/33 |
| 2009/0220765 A1 | 9/2009 | Okamura et al. | |
| 2010/0038012 A1 | 2/2010 | Tucker et al. | |
| 2010/0143824 A1* | 6/2010 | Tucker et al. | 429/483 |
| 2011/0053041 A1 | 3/2011 | Tucker et al. | |
| 2011/0269047 A1 | 11/2011 | Tucker et al. | |
| 2012/0325678 A1 | 12/2012 | Visco et al. | |

FOREIGN PATENT DOCUMENTS

| | | |
|---|---|---|
| CN | 101065860 | 10/2007 |
| CN | 200580040834.4 | 8/2009 |
| CN | 200580041105.0 | 12/2009 |
| EP | 428275 | 5/1991 |
| EP | 562724 | 9/1993 |
| EP | 1122806 | 8/2001 |
| EP | 1699104 | 9/2006 |
| EP | 2250295 | 1/2012 |

| | | |
|---|---|---|
| FR | 1585403 | 1/1970 |
| GB | 1276615 | 6/1972 |
| GB | 1383343 | 12/1974 |
| GB | 2156257 | 11/1984 |
| JP | 59-046695 | 9/1980 |
| JP | 56-002549 | 1/1981 |
| JP | 59-015960 | 1/1984 |
| JP | 59-016695 | 1/1984 |
| JP | 60-090875 | 5/1985 |
| JP | 05-089883 | 4/1993 |
| JP | 05-163078 | 6/1993 |
| JP | 06-042990 | 2/1994 |
| JP | 40-7006768 | 1/1995 |
| JP | 07-069749 | 3/1995 |
| JP | 07-126079 | 5/1995 |
| JP | 07-237980 | 9/1995 |
| JP | 07-267747 | 10/1995 |
| JP | 09-092301 | 4/1997 |
| JP | 09-188582 | 7/1997 |
| JP | 09-296203 | 11/1997 |
| JP | 10-021931 | 1/1998 |
| JP | 11-292618 | 10/1999 |
| JP | 11-297333 | 10/1999 |
| JP | 2001-126745 | 5/2001 |
| JP | 2002-289249 | 10/2002 |
| JP | 2002-301588 | 10/2002 |
| JP | 2003-288913 | 10/2003 |
| JP | 2004-039574 | 2/2004 |
| JP | 2004-047598 | 2/2004 |
| JP | 2004-127761 | 4/2004 |
| JP | 2004-142971 | 5/2004 |
| JP | 2004-164864 | 6/2004 |
| JP | 2004-207088 | 7/2004 |
| JP | 2004-273736 | 9/2004 |
| JP | 2005-288526 | 10/2005 |
| JP | 2005-353493 | 12/2005 |
| RU | 536922 | 11/1976 |
| RU | 1407675 | 7/1988 |
| RU | 1822388 | 6/1993 |
| RU | 2197441 | 1/2003 |
| RU | 2216602 | 11/2003 |
| RU | 2236331 | 9/2004 |
| WO | 97/00734 | 9/1997 |
| WO | 99/52165 | 10/1999 |
| WO | 9952165 | 10/1999 |
| WO | 99/65642 | 12/1999 |
| WO | 99/66570 | 12/1999 |
| WO | 00/34539 | 6/2000 |
| WO | 00/52780 | 9/2000 |
| WO | 02/35634 | 5/2002 |
| WO | 03/007312 | 1/2003 |
| WO | 2004/008556 | 1/2004 |
| WO | 2004/070858 | 8/2004 |
| WO | 2006/044313 | 4/2006 |
| WO | 2006/082057 | 8/2006 |
| WO | 2006/086037 | 8/2006 |
| WO | 2006/091250 | 8/2006 |
| WO | 2006086037 | 8/2006 |
| WO | 2006/116153 | 11/2006 |
| WO | 2006/127045 | 11/2006 |
| WO | 2008/016345 | 2/2008 |
| WO | 2009/014775 | 1/2009 |
| WO | 2009/099447 | 8/2009 |
| WO | 2009/128849 | 10/2009 |
| WO | 2010/030300 | 3/2010 |
| WO | 2011/127283 | 10/2011 |

OTHER PUBLICATIONS

U.S. Appl. No. 61/025,987, "CU-based cermet for high-temperature electrochemical device", Tucker et al., filed Feb. 4, 2008.
U.S. Appl. No. 61/026,079, "CU-based cermet for high-temperature electrochemical device", Tucker et al., filed Feb. 4, 2008.
U.S. Appl. No. 61/096,177, "Metal-supported, segmented-in-series high temperature electrochemical device", Tucker et al., filed Sep. 11, 2008.
CN patent application No. 200580040834.4, Office Action mailed Aug. 1, 2008.
CN patent application No. 200580041105.0, Office Action mailed Oct. 24, 2008.
CN patent application No. 200580040834.4, Notification to grant patent right for invention, mailed Apr. 17, 2009.
CA patent application No. 2,627,786, Office Action mailed Dec. 21, 2010.
CN patent application No. 200580041105.0, Notification to grant patent right for invention, mailed Aug. 28, 2009.
AU patent application No. 2005332026, Exam Report mailed Sep. 29, 2010.
AU patent application No. 2005327925, Office Action mailed Jul. 5, 2010.
AU patent application No. 2005327164, Office Action mailed Aug. 6, 2010.
EP patent application No. 05857980.6, Supplemental Search Report mailed Dec. 15, 2009.
EP patent application No. 05857595.2, Search Report mailed Oct. 15, 2009.
EP patent application No. 05857587.9, Supplemental Search Report mailed Oct. 26, 2009.
JP patent application No. 2007-543481, Exam Report mailed Oct. 5, 2010.
JP patent application No. 2007-543481, Notification of reasons for rejection mailed Oct. 5, 2010 (English translation).
Translated excerpt from JP2005-288526.
Translated excerpt from JP2004-047598.
MY patent application No. PI 20055578, Examination Report mailed Aug. 14, 2009.
RU patent application No. 2007124484-02, Office Action mailed Nov. 16, 2009.
TW patent application No. 094141561, Examination Report mailed Mar. 8, 2010.
RU patent application No. 200712448309, Office Action mailed Jan. 26, 2009.
CN patent application No. 200680055443.4, Office Action mailed Dec. 21, 2010.
RU patent application No. 200910693002, Office Action mailed Sep. 21, 2010.
VN patent application No. 1-2007-01278, Exam Report mailed Jul. 7, 2007.
VN patent application No. 1-2007-01267, Exam Report mailed Jul. 29, 2009.
WO patent application No. PCT/US05/42995 International Search Report and Written Opinion mailed Dec. 26, 2006.
WO patent application No. PCT/US05/43109 International Search Report and Written Opinion mailed Oct. 12, 2006.
WO patent application No. PCT/US05/42572, International Search Report and Written Opinion mailed Jun. 29, 2006.
WO patent application No. PCT/US05/042572, International Preliminary Report on Patentability mailed Jun. 14, 2006.
WO patent application No. PCT/US2006/029580, International Search Report and Written Opinion mailed Jul. 3, 2008.
WO patent application No. PCT/US2008/060362, International Search Report and Written Opinion mailed Jan. 12, 2009.
WO patent application No. PCT/US2008/066737, International Search Report and Written Opinion mailed Jan. 29, 2009.
WO patent application No. PCT/US2008/053869, International Search Report and Written Opinion mailed Oct. 29, 2008.
WO patent application No. PCT/US2008/081531, International Search Report and Written Opinion mailed Mar. 31, 2009.
Naka, Masaaki et al., "Joining of plain carbon steel to alumina with copper filler metal", XP009010006, Nov. 1985.
Stevenson, Jeff, "SOFC Seals: Materials Status", SSECA core technology program—SOFC meeting, Jul. 8, 2003.
Lee, Sungkyu et al., "Fabrication and characterization of Cu/YSZ cermet high-temperature electrolysis cathode material prepared by high-energy ball-milling method I.900° C-sintered", Journal of Alloys and Compounds, 448 (2008) 363-367.
Gorte, Raymond J. et al., "Anodes for direct oxidation of dry hydrocarbons in a solid-oxide fuel cell", Advanced materials, 2000, 12, No. 19, Oct. 2, 2000.

Park, Seungdoo et al., "Direct oxidation of hydrocarbons in a solid oxide fuel cell I. methane oxidation", Journal of the Eclectrochemical Society, 146 (10) 3603-3605 (19990.
Li, J.Q. et al., "Fabrication and thermal properties of a YSZ-NiCr joint with an interlayer of YSZ-NiCr functionally graded material", Journal of the European Ceramic Society 23 (2003) 1847-1853.
Zhou, Xia et al., "Fabrication of composite alloy cladding material by brazing process", Journal of Materials Processing Technology 168 (2005) 280-285.
Zhu, Minguang et al., "Improving the strength of brazed joints to alumina by adding carbon fibres", Chapman & Hall, 0022-2461, 1997, pp. 5321-5333, Apr. 17, 1997.
Blugan, Gurdial et al., "Brazing of silicon nitride ceramic composite to steel using SiC-particle-reinforced active brazing alloy", Ceramics International, 0272-8842, 2006, Elsevier Ltd.
U.S. Appl. No. 11/791,269, Office Action mailed Dec. 27, 2010.
U.S. Appl. No. 11/791,258, Office Action mailed Feb. 16, 2011.
European Examination Report mailed Feb. 14, 2011, for Application No. 08 768 912.1-3122.
JP patent application No. 2007-543579, Office Action mailed Jan. 25, 2011.
European Examination Report mailed Jun. 17, 2011 for Application No. 08770865.7.
U.S. Appl. No. 11/791,258, Office Action mailed Aug. 18, 2011.
U.S. Appl. No. 11/791,269, Office Action mailed Sep. 30, 2011.
U.S. Appl. No. 12/304,191, Office Action mailed Sep. 30, 2011.
EP patent application No. 05857587.9, Examination Report mailed Aug. 15, 2011.
MY patent application No. PI 20055579, Substantive Examination Adverse Report mailed Aug. 15, 2011.
CN patent application No. 200680055443.4, Second Office Action mailed Jul. 12, 2011.
PH patent application No. 12008502790, Office Action mailed Sep. 12, 2011.
EP patent application No. 08826523.6, Extended Search Report mailed Aug. 30, 2011.
U.S. Appl. No. 11/791,270, Office Action mailed Jul. 27, 2011.
U.S. Appl. No. 11/791,258, Office Action mailed Dec. 6, 2011.
JP patent application No. 2007-543579, Final Decision of Rejection mailed Oct. 4, 2011.
CA patent application No. 2,627,863, Office Action mailed Nov. 17, 2011.
JP patent application No. 2007-543481, Office Action mailed Nov. 29, 2011.
JP patent application No. 2009-521730, Office Action mailed Oct. 25, 2011.
RU patent application No. 2010147046/20(067957), Office Action of the Formal Examination mailed May 4, 2011.
MY patent application No. PI20055578, substantive examination mailed Dec. 30, 2011.
KR patent application No. 10-2007-7009946, Notification of Provisional Rejection mailed Jan. 20, 2012.
IN patent application No. 2386/KOLN/2007, First Examination Report mailed Jan. 31, 2012.
EP patent application No. 06836096.5, Supplementary European Search Report mailed Feb. 3, 2012.
Ishida et al., NGK Spark Plug Co. Ltd., abstract of JP 19830079832, Thomson Scientific, XP-002667365, Nov. 21, 1984.
Fujiki et al., Kobe Steel Ltd., abstract of JP 19960109959, Thomson Scientific, XP-002667366, Nov. 18, 1997.
AU patent application No. 2008279577, Examiner's first report mailed Jan. 27, 2012.
PH patent application No. 12010500175, Office Action mailed Feb. 2, 2012.
RU patent application No. 2010136676/20, Office Action of the Formal Examination mailed Jan. 17, 2011.
U.S. Appl. No. 11/791,270, Office Action mailed Mar. 15, 2012.
TW patent application No. 094141908, Search Report mailed Mar. 19, 2012.
U.S. Appl. No. 12/304,191, Notice of Allowance mailed May 14, 2012.
U.S. Appl. No. 12/082,320, Office Action mailed Apr. 13, 2011.
U.S. Appl. No. 12/082,320, Office Action mailed Nov. 9, 2011.
U.S. Appl. No. 12/082,320, Office Action mailed Mar. 28, 2012.
U.S. Appl. No. 10/061,127, Office Action mailed Jun. 23, 2004.
U.S. Appl. No. 10/061,127, Notice of Allowance mailed Jan. 5, 2005.
U.S. Appl. No. 10/724,558, Notice of Allowance mailed Sep. 9, 2004.
U.S. Appl. No. 11/042,788, Office Action mailed Jan. 16, 2007.
U.S. Appl. No. 11/042,788, Office Action mailed Jan. 31, 2008.
U.S. Appl. No. 11/042,788, Office Action mailed Sep. 3, 2008.
U.S. Appl. No. 11/042,788, Office Action mailed Oct. 30, 2008.
U.S. Appl. No. 11,042,788, Notice of Allowance mailed Mar. 9, 2009.
U.S. Appl. No. 09/626,629, Office Action mailed May 9, 2002.
U.S. Appl. No. 09/626,629, Notice of Allowance mailed Aug. 13, 2002.
U.S. Appl. No. 10/273,812, Office Action mailed Nov. 30, 2004.
U.S. Appl. No. 10/273,812, Office Action mailed Mar. 21, 2005.
U.S. Appl. No. 10/273,812, Notice of Allownce mailed Aug. 3, 2005.
U.S. Appl. No. 11/260,009, Office Action mailed Feb. 17, 2006.
U.S. Appl. No. 11/260,009, Notice of Allowance mailed Apr. 28, 2006.
U.S. Appl. No. 11/471,774, Notice of Allowance mailed Oct. 30, 2007.
U.S. Appl. No. 12/027,183, "Structures and fabrication techniques for solid state electrochemical devices," Visco et al., filed Feb. 6, 2008.
EP1228546, "Structures and fabrication techniques for solid state electrochemical devices," Visco et al., Aug. 7, 2002, abstract.
Seabaugh et al., "Low-cost fabrication processes for solid oxide fuel cells," NexTech exhibited at the Fuel Cells 2000 Conference in Protland, Oct. 30, 2000-Nov. 2, 2000, NexTech Materials, Ltd.
Fujii et al., "Manufacturing and characterization of metallic system support tube for solid oxide fuel cells," Bulletin of the Electrotechnical Laboratory, vol. 62, No. 1-2, 1998, p. 1319.
Momma et al., "High potential performance of tubular type SOFC using metallic system components," Electrotechnical Laboratory, Electrochemical Proceedings vol. 97-40, Jun. 1997, pp. 310-321.
Okuo et al., "Development of metallic substrate tubular SOFC," Electrotechnical Laboratory, Oct. 1994, pp. 908-919.
Okua et al., "Improvement in power stability and durability demonstration on new tubular type SOFC using metallic system component," vol. 60, No. 5, 1996, pp. 1-9.
Schiller et al., "Development of metallic substrate supported thin-film SOFC by applying plasma spray techniques," Electrochemical Society Proceedings, vol. 99-19, Oct. 1999, pp. 892-903.
Schiller et al., "Development of plasma sprayed components for a new SOFC Designs," Electrochemical Proceedings, vol. 97-40, Oct. 1999, pp. 634-645.
Schiller et al., "Development of SOFC components by vacuum plasma spraying," 1998, pp. 515-518.
Takenoiri et al., "Development of metallic substrate supported planar SOFC at Fuji Electric," Fuel Cell Seminar Bastracts, Nov. 1998, pp. 84-87.
Unal, et al., "Microstructures of $Y_2O_3$-Stabilized $ZrO_2$ Electron Beam-Physical Vapor Deposition Coatings on Ni-Base Superalloys", Department of Materials Science and Engineering, vol. 984-92, 1994, pp. 984-992.
Wallin, et al., "Cofired Solid Oxide Fuel Cells for Operation at 800° C", 1997, Abstract.
Yao, et al, "Improved preparation procedure and properties for a multiplayer piezoelectric thick-film actuator", Sensors and Actuators A 71, Received Dec. 9, 1997; received in revised form Apr. 27, 1998; accepted May 1, 1998, pp. 139-143.
"Mfg. Oxygen Sensor—Involves Applying Catalyst Metal Salt Soln. To Sintered Electrolyte, Reducing, Firing, Again Applying Metal Salt Soln. and Firing", Matsushita Elec Ind Co Ltd [MATU], 1979JP-0078760 (Jun. 21, 1979), (abstract), pp. 1-2.
CN patent application No. 200880128414.5, First Office Action issued Mar. 20, 2012.
PH patent application No. 12008502790, Office Action mailed Apr. 27, 2012.
RU patent application No. 2010105992/07, Office Action mailed Apr. 4, 2012.
PH patent application No. 12010500175, Office Action mailed May 23, 2012.

CN patent application No. 200680055443.4, Third Office Action mailed Apr. 16, 2012.
U.S. Appl. No. 11/791,258, Office Action mailed Jun. 7, 2012.
Ishihara et al., "Electrophoretic deposition of Y2O3-stabilized ZrO2 electrolyte films in solid oxide fuel cells," J. Am. Ceram. Soc. 79 (4) 913-19 (1996), Jan. 26, 1995.
Ishihara et al., "Electrophoretic deposition of Y2O3-stabilized ZrO2 on the porous La0.8Sr02MnO3 cathode substrate for SOFC," Proceedings of the 4th International Symposium on Solid Oxide Fuel Cells, Electrochemical Society, 1995.
U.S. Appl. No. 11/791,258, Notice of Allowance mailed Jul. 25, 2012.
U.S. Appl. No. 13/599,362, "Structure and fabrication techniques for solid state electrochemical devices," Visco et al., filed Aug. 30, 2012.
U.S. Appl. No. 12/027,183, Notice of Allowance mailed Jul. 18, 2012.
CN patent application No. 200880108590.2, Office Action mailed Jun. 1, 2012.
PH patent application No. 12008502790, Office Action mailed Jul. 4, 2012.
U.S. Appl. No. 12/664,646, Office Action mailed Sep. 13, 2012.
U.S. Appl. No. 11/791,270, Office Action mailed Nov. 9, 2012.
U.S. Appl. No. 13/599,362, Office Action mailed Nov. 6, 2012.
U.S. Appl. No. 13/637,642, "Method of making electrochemical device with porous metal layer," Tucker et al., filed Sep. 26, 2012.
ID patent application No. W00201003079, Notification of Result of Substantive Examination Step I mailed Jun. 1, 2012.
ID patent application No. W00201003962, Notification of Result of Substantive Examination Step I mailed Jun. 18, 2012.
EP patent application No. 08826523.6, Examination Report mailed Oct. 23, 2012.
U.S. Appl. No. 12/304,191, Notice of Allowance mailed Nov. 15, 2012.
RU patent application No. 2010147046/07, Office Action mailed Oct. 19, 2012.
RU patent application No. 2010105992/07, Resolution on granting patent for invention mailed Sep. 6, 2012.
MY patent application No. PI2010000360, Substantive Examination mailed Dec. 31, 2012.
CN patent application No. 200680055443.4, Fourth Office Action mailed Nov. 21, 2012.
EP patent application No. 08 768 912.1, Communication under Rule 71(3) EPC, Intent to Grant, mailed Jul. 14, 2011.
U.S. Appl. No. 12/664,646, Office Action mailed Mar. 1, 2013.
U.S. Appl. No. 11/791,269, Office Action mailed Mar. 17, 2011.
U.S. Appl. No. 11/791,269, Office Action mailed Mar. 14, 2013.
Yaws, Carl L., "Table 1. Physical Properties—inorganic compounds," Yaws' Critical Property Data for Chemical Engineers and Chemists, Knovel, 2012.
CN patent application No. 200680055443.4, Office Action mailed Feb. 6, 2013.
RU patent application No. 2007124482/02, Office Action mailed Nov. 2, 2009.
MY patent application No. PI2010004878, Certificate of Grant dated Jan. 31, 2013.
JP patent application No. 2011-504989, Office Action mailed Feb. 19, 2013.
ID patent application No. W-00201003962, Notification of Allowance to be Granted, mailed Oct. 29, 2012.
EP patent application No. 08770865.7, Communication under Rule 71(3) Intent to Grant, mailed Nov. 15, 2011.
CN patent application No. 200880129911.7, First Office Action, mailed Nov. 28, 2012.
RU patent application No. 2009106930, Certificate of Grant, registered Oct. 27, 2011.
PH patent application No. 12008502790, Notice of Allowance, mailed Sep. 7, 2012.
AU patent application No. 2005327925, Notice of Acceptance, mailed Jan. 12, 2011.
PH patent application No. 1/2010/502361, Examination Report mailed Apr. 4, 2013.
U.S. Appl. No. 11/791,270, Notice of Allowance mailed Mar. 15, 2013.
U.S. Appl. No. 13/599,362, Office Action mailed Apr. 17, 2013.
U.S. Appl. No. 12/865,956, Office Action mailed Apr. 24, 2013.
CN patent application No. 200880108590.2, Second Office Action mailed Apr. 2, 2013.

* cited by examiner

INTEGRATED SEAL FOR HIGH-TEMPERATURE ELECTROCHEMICAL DEVICE

STATEMENT OF GOVERNMENT SUPPORT

This invention was made with government support under Contract DE-AC02-05CH11231 awarded by the United States Department of Energy to The Regents of the University of California for the management and operation of the Lawrence Berkeley National Laboratory. The government has certain rights in this invention.

FIELD OF THE INVENTION

The present invention relates to sealing high-temperature electrochemical devices, such as solid oxide fuel cells.

BACKGROUND

Solid-state electrochemical devices are normally cells that include two porous electrodes, the anode and the cathode, and a dense solid electrolyte membrane disposed between the electrodes. In the case of a typical solid oxide fuel cell, the anode is exposed to fuel and the cathode is exposed to an oxidant in separate closed systems to avoid any mixing of the fuel and oxidants.

External seals are used to seal off the closed systems and prevent mixing. While no dominant seal technology exists, examples includes braze seals, compressive seals and glass seals. Seal-less designs, which allow mixing of the fuel and oxidant streams at the outlet of the device, have also been in development, though oxidant and fuel mixing is generally undesirable. Long-term performance of braze seals has not been demonstrated. In addition, braze seals can be costly and the coefficient of thermal expansion ("CTE") must be modified to match the CTE of the electrolyte. Compressive seals are generally made with mica, display high leak rate and have poor thermal cycling capability. Glass seals can react with sealed surfaces and also have poor thermal cycling ability.

SUMMARY OF THE INVENTION

The present invention provides electrochemical device structures having integrated seals and methods of fabricating them. According to various embodiments, the structures include a thin, supported electrolyte film with the electrolyte sealed to the support. The perimeter of the support is self-sealed during fabrication. The perimeter can then be independently sealed to a manifold or other device, e.g., via an external seal. According to various embodiments, the external seal does not contact the electrolyte, thereby eliminating the restrictions on the sealing method and materials imposed by sealing against the electrolyte.

One aspect of the invention relates to electrochemical device structure having an integrated seal. The devices include first and second electrodes separated by a dense electrolyte and a support having dense and porous support regions. The dense and porous support regions share a dense support/porous support interface and are composed of the same material type (e.g., they are both metal or both cermet). The dense electrolyte is disposed on at least a portion of the dense support region to form an electrolyte/dense support interface. The electrolyte/dense support interface and dense support/porous support interface form a gas tight seal between the first electrode and the second electrode.

Another aspect of the invention relates to an electrochemical device structure having an integrated seal. The device includes first and second electrodes separated by a dense electrolyte; a porous support region cosintered to a dense support region to form a gas impermeable dense support/porous support interface; the dense electrolyte cosintered to at least a portion of the dense support region to form a gas impermeable electrolyte/dense support interface. The electrolyte/dense support interface and dense support/porous support interface forming a gas tight seal between the first electrode and the second electrode.

In certain embodiments, the dense support region provides a point of mechanical attachment to a housing, sheet, etc. For example, an external sealing member may be connected to the dense support region, to provide a further seal and/or to mount the device to a manifold, housing, another device, etc. This external sealing member is not in physical contact with the dense electrolyte. According to certain embodiments, the external sealing member is metal, and may be a brazed or welded joint. Also in certain embodiments, the dense support is fitted to a metal housing, e.g., by threading. In certain embodiments, the dense support region provides an electrical contact point for exchanging current or voltage with the device.

The porous support region may be an electrode or support an electrode. In certain embodiments, a ceramic or cermet interlayer is disposed between the porous support region and the dense electrolyte. This interlayer may function as an electrode. In certain embodiments, the porous and dense support regions are made of the same material (e.g., both are Ni—YSZ, or Cu—YSZ, or stainless steel). The device may be of any geometry, including planar and tubular geometries. In certain embodiments, solid oxide fuel cells are provided.

Another aspect of the invention relates to a method of fabricating an electrochemical device structure having an integrated seal. The method involves providing a support structure green body configured such that upon sintering, adjacent dense and porous support regions are formed; coating at least a portion of the support structure green body with a green electrolyte material; and cosintering the support structure green body and green electrolyte material such that a) a support having adjacent porous and dense support regions is formed, b) the dense support region and the electrolyte become substantially gas impermeable, and c) an integrated gas-tight seal is formed at an electrolyte/dense support region interface.

In certain embodiments, prior to coating a portion of the support structure green body with a green electrolyte material, green interlayer material is deposited on at least a portion of the support structure green body. The green electrolyte material is then deposited on the interlayer as well as a portion of the green support structure.

In certain embodiments, after sintering, the dense support region is attached to an external metal seal, housing, manifold or fitting such that the seal, housing, manifold or fitting does not contact the electrolyte. The external seal, etc. may also be sintered to the dense support region during the cosintering operation.

These and other features and advantages of the present invention will be presented in more detail in the following specification of the invention and the accompanying figures which illustrate by way of example the principles of the invention.

DESCRIPTION OF THE INVENTION

Reference will now be made in detail to specific embodiments of the invention. Examples of the specific embodiments are illustrated in the accompanying drawings. While the invention will be described in conjunction with these specific embodiments, it will be understood that it is not intended to limit the invention to such specific embodiments. On the contrary, it is intended to cover alternatives, modifications, and equivalents as may be included within the scope of the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Electrochemical devices generally have an ion-conducting electrolyte sandwiched between a porous anode and cathode in fuel cell applications. (Although a fuel cell is used as an example of an electrochemical device for purposes of illustration, it will be understood that the electrochemical device structures described herein include oxygen generators, syngas generators, hydrogen gas separators and similar devices.)

The present invention provides electrochemical device structures having integrated seals and methods of fabricating them. The integrated seal separates the atmosphere on one side of the electrolyte (e.g., air) from the atmosphere on the other side of the electrolyte (e.g., fuel). The devices generally have a support layer including a porous support member or region and a dense support member or region on which a solid electrolyte is disposed. By cosintering the electrolyte, dense support and porous support, an integrated seal exists at the porous support/dense support and the electrolyte/dense support interfaces. As used herein, "dense" support or electrolyte region refers to a support or electrolyte that is substantially free of connected porosity such that it is substantially gas-tight.

Figure 1:
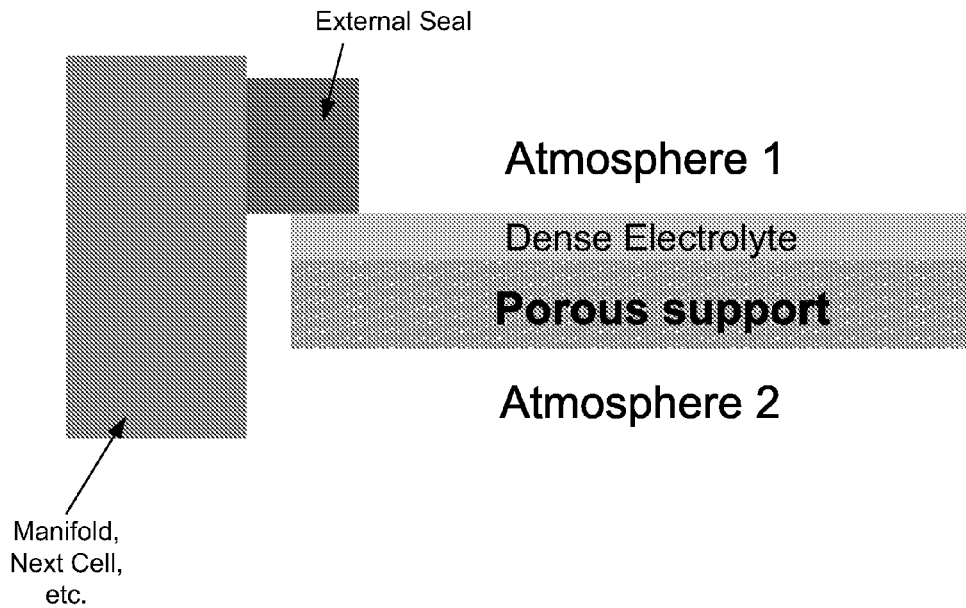
FIG. 1 is a schematic of a conventional seal used in a solid oxide fuel cell stack.

FIG. 1 shows a typical design of a conventional device structure in which an external seal is sealed against the dense electrolyte. In addition to preventing atmospheres 1 and 2 from mixing, the external seal seals the device to a manifold. The external seal may also seal the device to another device or to a metal housing. Sealing the external seal directly against the electrolyte severely limits the seal material and method of sealing. For example, the material must wet or conform to the electrolyte surface, be chemically compatible with the electrolyte, and be applied by processes that do not deteriorate the electrolyte. Moreover, it requires matching the coefficient of thermal expansion (CTE) of the external and electrolyte materials to avoid causing undesirable stress in the electrolyte.

Figure 2:
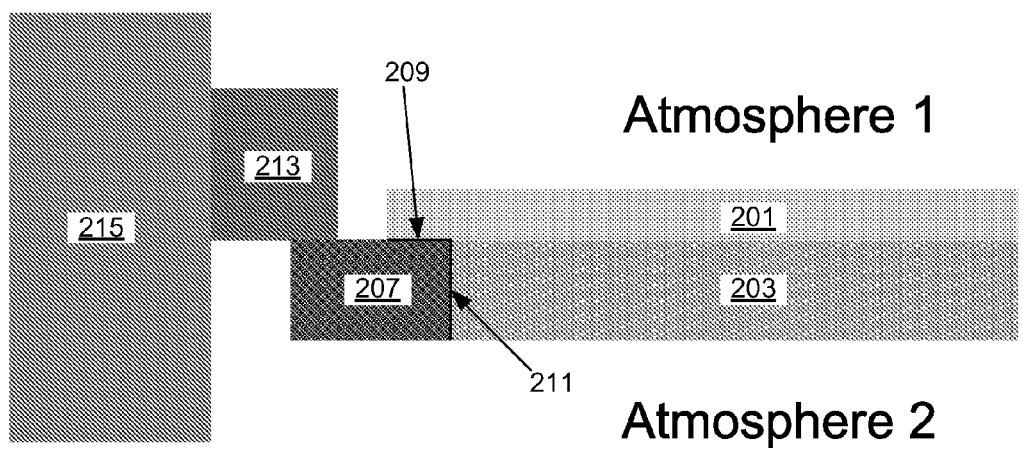
FIG. 2 is a schematic of electrochemical device structure having an integrated seal in accordance with certain embodiments of the present invention.

FIG. 2 is a schematic of electrochemical device having an integrated seal in accordance with certain embodiments of the present invention. The dense electrolyte 201 is on a porous support 203. An end or perimeter portion of the dense electrolyte 201 on a dense support 207, forming an electrolyte/dense support interface 209. The porous support and the dense support are part of the same layer and contact each other at a porous support/dense support interface 211. Interfaces 209 and 211 form an integrated seal that keeps atmospheres 1 and 2 from mixing. In order to prevent atmospheres 1 and 2 from mixing, the dense electrolyte seals against the dense support. The dense support is substantially free of connected porosity and cracks such that it is substantially gas-tight, i.e., it has an acceptably low leak rate between atmospheres 1 and 2. (Depending on the material, the density, i.e., the percentage of bulk volume of a network that is filled by solid material, may be at least 80%, 90%, 95%, etc. to make the material substantially free of connected porosity.) The porous support is porous enough to allow sufficient permeation of atmosphere 2 through the support so that the electrochemical reaction may occur.

As is discussed further below, the porous support and dense support are made of the same material type, typically either both a metal or both a cermet. In certain embodiments, they are both the same material, e.g., ferritic stainless steel.

In the embodiment depicted in FIG. 2, the dense support extends beyond the electrolyte and attaches to an external seal 213. The external seal in turn is joined to a metal housing 215. The external seal is typically a metal; because the external seal is sealed against the dense support and not the electrolyte, the choice of metal or other material is not limited by electrolyte compatibility considerations, such as CTE matching. Note that in conventional device shown in FIG. 1, the external seal both prevents mixing of atmosphere 1 and atmosphere 2 and mounts the device against the metal housing. These functions are separated in the embodiment depicted in FIG. 2: the integrated seal prevents mixing atmosphere 1 and atmosphere 2 while the external seal is used to connect or mount the device to the metal housing.

In certain embodiments the porous support is a porous electrode. Electrode supported cells can be either anode supported or cathode supported. The electrode supports are typically a metal, e.g., a metal alloy, or a ceramic metal composite (cermet). Examples of metals that may be used include nickel, copper, iron, chromium, titanium, stainless steel and chromium containing nickel alloys. Examples of cermets that may be used include Ni—YSZ and Cu—YSZ. In certain embodiments, the support layer provides mechanical support but is not an electrode. For example, a support may be composed of an inexpensive high strength material, such as a metal, with an electrode layer is composed of a material having high electrocatalytic activity for a specific purpose, for example methane reformation, oxygen reduction or hydrogen oxidation. (Examples of structures in which an interlayer disposed between the porous support and the dense electrolyte functions as an anode are discussed further below with reference to FIGS. 3c-3d.)

The dense support material is of the same type as the porous support, e.g., the dense support and porous support are metal/metal or cermet/cermet. If metal, the dense and porous supports may be the same metal or alloy or may be different metals or alloys. Similarly, if cermet, the dense and porous supports may be the same or different cermets. The support can have a sharp boundary between the dense and porous sections, or can be a graded structure that changes from porous or dense over some distance.

Figure 3A:
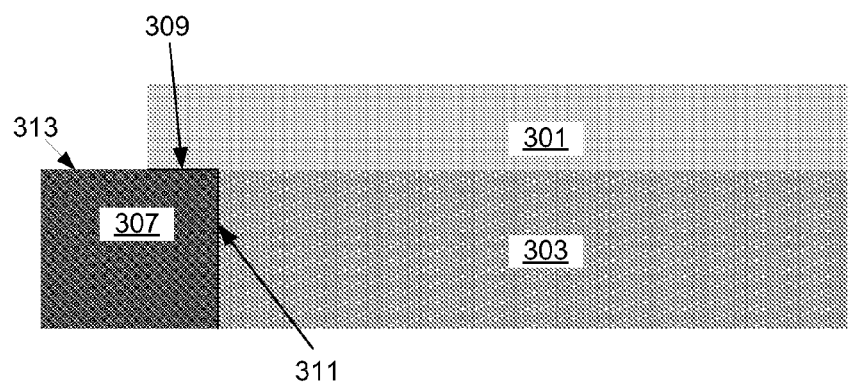
FIGS. 3a-3d are schematics of electrochemical device structures having an integrated seal in accordance with certain embodiments of the present invention.

FIGS. 3a-3d show schematic representations of various implementations of supports and electrolytes in which the electrolyte is sealed against a dense support in accordance with the invention. FIG. 3a shows an assembly as depicted in FIG. 2, with dense electrolyte 301 overlaying porous support 303 and an end or perimeter portion of the dense electrolyte 301 on a dense support 307. Electrolyte/dense support and porous support/dense support interfaces 309 and 311 are also indicated. The dense support area 307 has an exposed area 313 that is not covered by the electrolyte. This exposed area may be used for attachment to an external member or housing as described above.

Figure 3B:
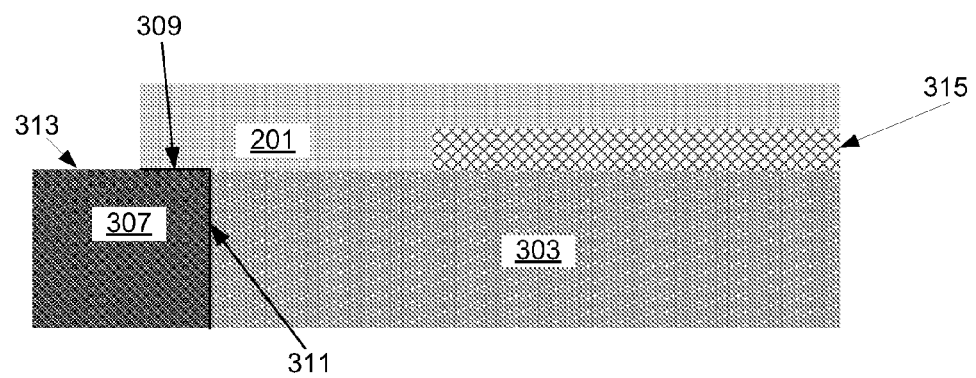
Figure 3C:
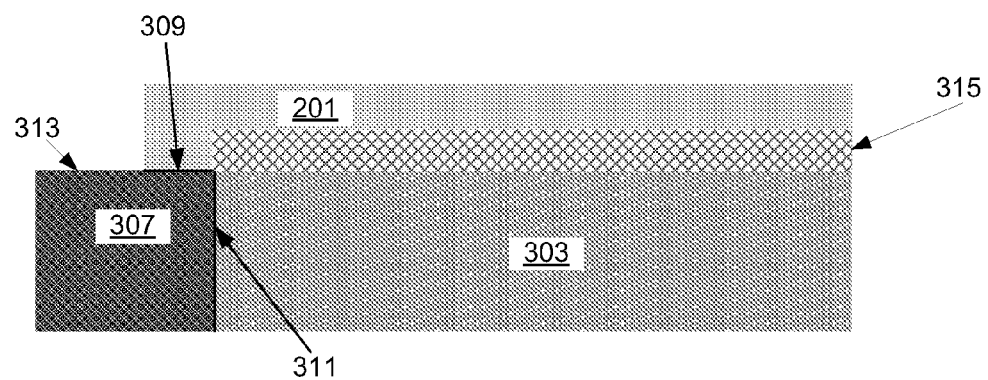
Figure 3D:
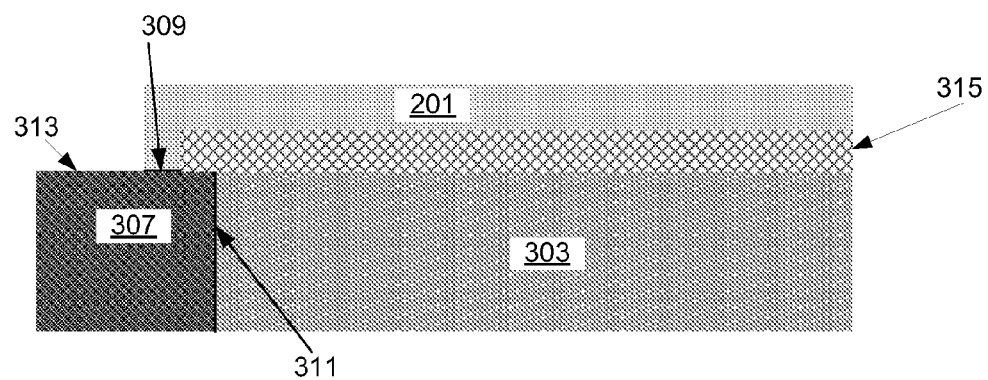

As indicated above, in certain embodiments, an interlayer is disposed between the support and electrolyte. FIGS. 3b-3d each show a device structure having a porous interlayer 315. The porous interlayer may be a ceramic, cermet or metal interlayer. In one example, the porous interlayer is a ceramic or cermet interlayer, e.g., a YSZ or Ni—YSZ interlayer, which may function as an electrode and/or aid the spray deposition of a smooth, continuous, thin electrolyte film by bridging the metal particles of the porous support. Various embodiments of this invention include the presence or absence of this interlayer. If the interlayer is present, it may be present over part of just the porous support region (FIG. 3b), it may be present over all of the porous support region (FIG. 3c), or it may span the dense/porous support interface (FIG. 3d).

In certain embodiments, the dense support is connected to an external seal, as is shown in FIG. 2, which may then connect, directly or through additional members, to a housing, manifold, another device (e.g., in a multi-cell stack), etc. In certain embodiments, the dense support may connect directly to the housing or other structure, e.g., by threading, crimping, insertion into a hole in the housing, or other type of bonding or attachment, including welding and brazing.

Typically, the electrolyte contacts only an internal portion of the dense support region surface, with the end or perimeter of the support extending beyond the electrolyte. The internal portion of the dense support is sealed to the electrolyte, with the external portion available to bond to an external seal. In certain embodiments, however, the dense support may not extend further than the electrolyte. An external seal can be attached to the surfaces of the support away from the electrolyte.

Figure 4A:
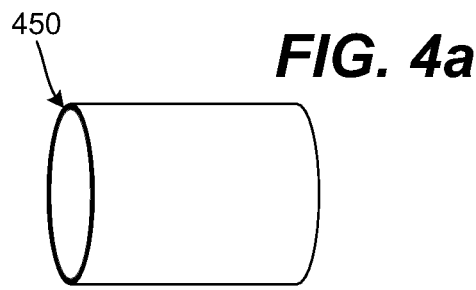
FIGS. 4a-4c are schematics showing placement of integrated seals in tubular devices in accordance with certain embodiments of the present invention.
Figure 4B:
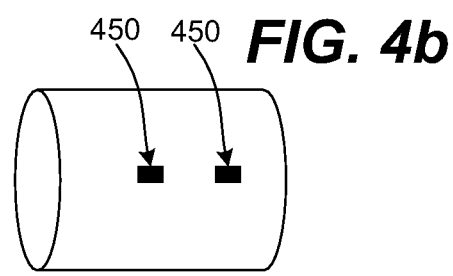
Figure 4C:
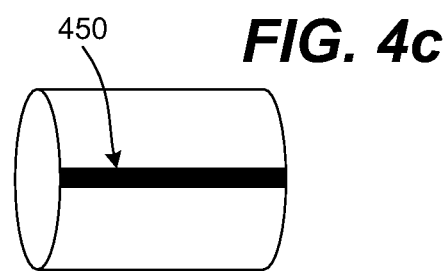

The integrated seal is applicable to any device geometry, including planar and tubular geometries. A single device may contain one or multiple integrated seals. The integrated seal exists anywhere the perimeter of the electrolyte overlays a dense part of the support. For example, FIGS. 4a-4c shows various embodiments of an integrated seal in a tubular device. Area 450 represents the portion of the dense support region that contacts an overlaying electrolyte. The integrated seal may be at the perimeter of the device (FIG. 4a), an interior section of the device (FIG. 4b), or an area that contacts both the perimeter and interior of the device (FIG. 4c). A single device may contain one or more integrated seals. For instance, a tube may have an integrated seal as shown in FIG. 4a at one or both ends. Similarly a device may have one or multiple integrated seals in the device interior; FIG. 4b shows two such interior seals. A device may also be sealed at an end as in FIG. 4a and at an interior location as in FIG. 4b or 4c. Note that in the embodiments shown in FIGS. 4b and 4c, another seal may be used to seal the perimeter of the device.

Figure 4D:
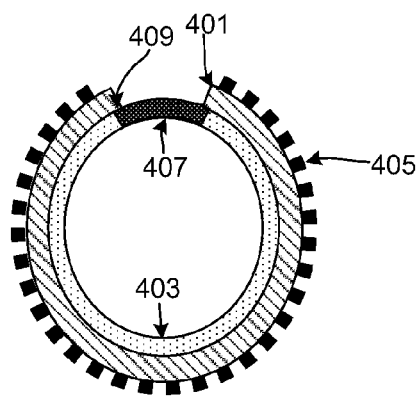
FIGS. 4d and 4e are cross-sectional schematics of electrode and electrolyte layers in tubular devices in accordance with certain embodiments of the present invention.

FIG. 4d shows a cross-sectional schematic view of an electrolyte and electrode layers in an example of tubular structure of FIG. 4b or 4c. An external electrode layer 405, dense electrolyte 401 and an internal support layer including porous internal portion 403 and a dense portion 407 are shown. The dense portion 407 is sealed to the dense electrolyte 401, with a dense electrolyte/dense support interface or boundary is indicated at 409. In other embodiments, the support having dense and porous regions may be on the external part of the tubular structure (e.g., layer 405 in FIG. 4d may be a support layer with dense and porous regions). According to various embodiments, the tubular device may also include other components including internal and/or external current collectors, catalysis layers, external seals, metal housing (not shown). Dense region 407 is a contact point for electrical and/or mechanical attachment (e.g., allowing electrical access to interior layer 403), enabled by the integrated seal at the interface of dense region 407 and electrolyte 401. The dense region 407 may be recessed or flush with respect to electrolyte 401 (as in FIG. 4d), or it may be proud of electrolyte 401 (as in FIG. 4e, described further below).

Figure 4E:
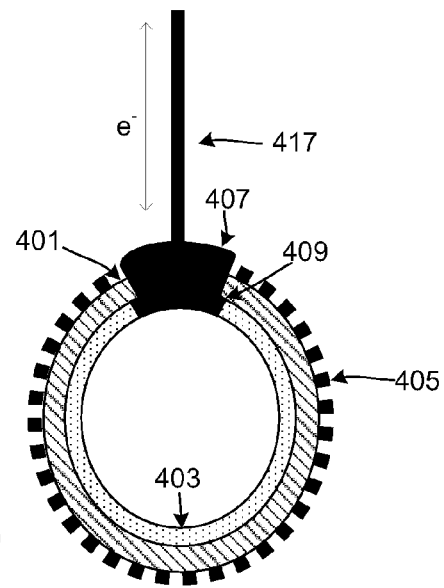

According to various embodiments, the exposed dense support areas, both at the perimeter (as in FIGS. 4a and 4b) and in the interior (as in FIGS. 4b and 4c) of the device, may be used as attachment points for mechanical support such as a tube sheet or connecting rod. Also, as indicated above, in certain embodiments the exposed dense support areas are used as electrical contact points for exchanging voltage or current with the device. FIG. 4e shows cross-sectional schematic view of a tubular structure with an electrical connection 417. Dense portion 407 is connected to the electrical connection 417 and functions as an electrical contact point to the interior of the device. Note that in this embodiment, the dense portion 407 is proud of the electrolyte 401, which can facilitate electrical contact. Examples of uses of these electrical contact points include device monitoring and control, as the current path for connecting multiple devices in series and/or parallel, and as current extraction points to alleviate total device current restrictions imposed by edge current collection.

Figure 5:
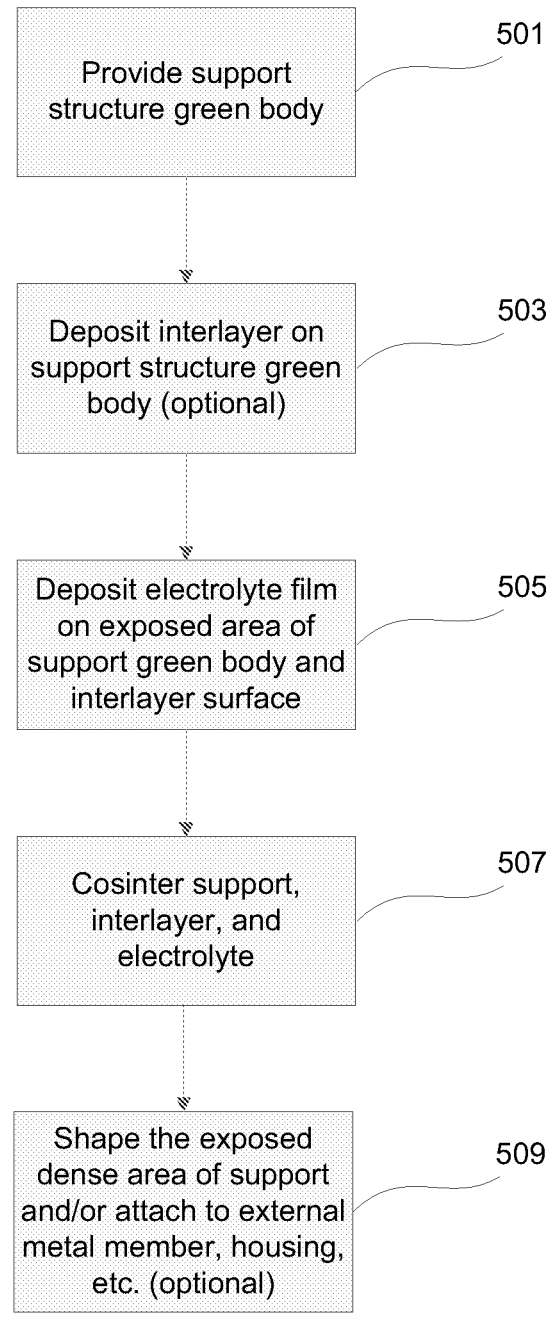
FIG. 5 is a process flow sheet depicting stages of a process of fabricating electrochemical device structures in accordance with certain embodiments of the present invention.

FIG. 5 is a flow chart depicting stages of a process of fabricating electrochemical device structures having integrated seals according to certain embodiments of the present invention. First, in an operation 501, a support structure green body is provided. The support structure includes both the porous and dense areas as described above. It may be a single material having porous and dense areas, or it may be different materials placed adjacent to each other. At this point in the process, however, the structure is green; that is, it has not yet been fired to a temperature sufficiently high to sinter the materials. Providing the support structure green body may involve preparing powders or particles for the dense region and porous region. Porosity can be controlled by factors including particle size and/or the use and amount of pore-former. The support structure green body may then be formed, e.g., by loading or placing the dense powder (i.e., the powder that is to become the dense section) and porous powder into a mold or die such that the dense powder is placed at the end or perimeter or otherwise appropriately placed. The support structure green body may then be bisque fired or otherwise treated to create handling strength.

Once the support structure green body is formed, an interlayer is optionally deposited on the support structure green body in an operation 503. As described above, the interlayer may cover all or part of the porous area of the support structure, and may span the dense/porous interface. An area of the dense support structure surface is left exposed to seal against the electrolyte. In one example, a YSZ interlayer is formed by dipcoating from a slurry of YSZ and poreformer particles. Other known methods of coating or depositing may be used.

Then, in an operation 505, an electrolyte film is deposited on the interlayer surface (if present) and the desired areas of the green support structure, including at least a portion of the exposed dense area surface. As discussed above with reference to FIG. 2, in many embodiments the electrolyte contacts only a portion of the dense support with the remainder of the dense support free for bonding to an external seal, manifold, metal housing, etc. Any appropriate method of depositing the electrolyte may be used. In one example, aerosol spraying is used to spray a YSZ electrolyte onto the surface.

The support layer structure having dense and porous regions, the interlayer, if present, and electrolyte are then cosintered in an operation 507. During this process, all of the components shrink. The end area of the support structure becomes dense, the electrolyte becomes dense, and the electrolyte and the dense end of the support structure are joined through mechanical interlocking to produce a seal at that interface. The layers of the resulting structure may be said to be cosintered: e.g., cosintering of the electrolyte and dense support region produces an electrolyte layer cosintered to the dense support region. Note that unlike conventional methods this electrolyte/support seal is created during fabrication and not as a later step. This has benefits for inexpensive and easy manufacturing. Moreover, because the seal is integrated, sealing performance and lifetime are expected to increase. By densifying the end of the support structure, the cosintering operation produces a seal at the dense and porous support interface. As indicated above, this interface boundary may be sharp or graduated.

Effective cosintering the electrolyte in contact with the dense support region creates significant mechanical interlocking between the two providing an integrated hermetic seal. Effective cosintering of the electrolyte, porous support region and dense support region is facilitated through selection of appropriate materials, particle size, sintering schedule and poreformer/binder additives. The particle size and green density of the support are chosen so that after sintering, the porous region is porous and the dense region sinters to near full density. Support materials having similar shrinkage to the electrolyte may be used. CTE matching between the support and electrolyte is described in U.S. Pat. No. 6,605,316, titled "Structures And Fabrication Techniques For Solid State Electrochemical Devices," incorporated by reference herein in its entirety. As indicated, the support materials may be selected to have a good CTE match with the electrolyte. Note that CTE matching between the support and electrolyte (2 materials) is easier than CTE matching between the support, electrolyte and a seal material (3 materials) that may be required with prior art methods.

Examples of electrolyte materials include stabilized zirconias, including zirconias having about 1-11 mol % of one of the following dopants: yttria, calcia, scandia, ceria, and combinations thereof.

In certain embodiments, using the same material for the porous and dense regions of the support aids in effective cosintering. For example, stainless steel metal may be used for both regions. Particle size, addition and amount of poreformer and green density may be different for the porous and dense support regions.

After the sintering operation, the dense area of the support may be optionally shaped and/or attached to an external seal, metal housing, fitting, etc. in an operation 509. As indicated, the dense support typically has an exposed area, which is not in contact with the electrolyte. See, e.g., area 313 in FIGS. 3a-3d. In certain embodiments, this area may be shaped to aid fitting to an external seal, manifold, etc. The exposed dense area of the support may be shaped by net-shape sintering, machining or otherwise shaping after sintering, and addition of other parts by fastening, welding, brazing, diffusion bonding, etc. For instance, the dense butt end of the tube in FIG. 4a may be threaded, contain a lip, protrusion, depression, etc. that aligns or assists in joining the device to an external surface such as a manifold or second device. This may be a permanent method of joining or may assist in providing mechanical integrity during further production operations. For example, the dense support could have pins rising from its surface that interlock with slots in a manifold or second device. These could provide stability and alignment during a later brazing, welding, crimping, or other operation Likewise the interior dense support section in FIG. 4b may have a protrusion or depression that facilitates electrical or mechanical connection to other devices, manifolds, electrical conduits, etc.

Figure 6:
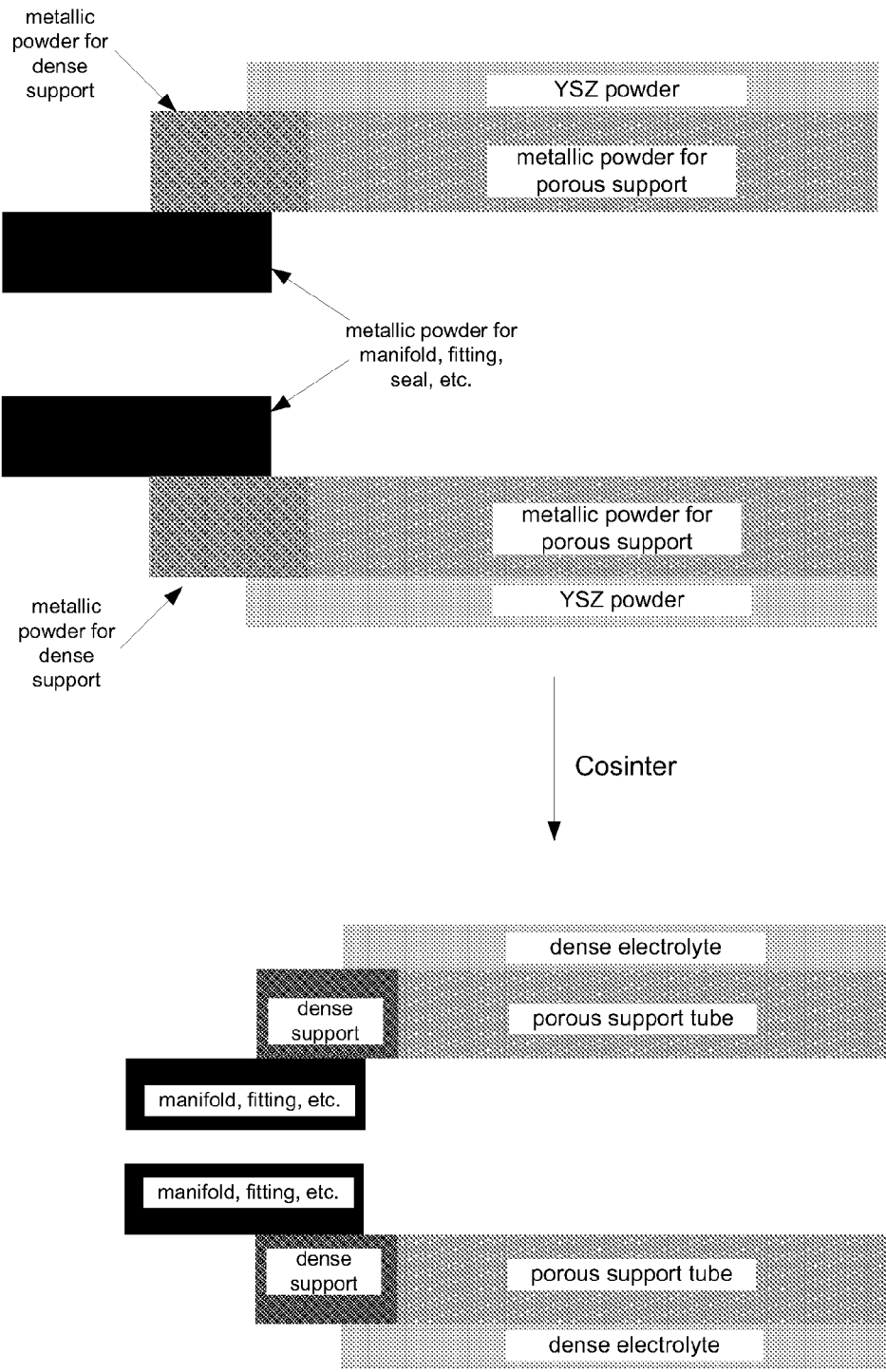
FIG. 6 is a schematic illustration of a method of fabricating an electrochemical device having an integrated seal in which the dense support is cosintered to an external component in accordance with certain embodiments of the present invention.

In certain embodiments, the dense support area contacts an external object during sintering, where the external object is made of a material that will sinter-bond with the dense support. For example, the tube of FIG. 3a could have a flared or threaded tubular fitting disposed inside the dense area of the tube. During the sintering operation (described above with reference to block 507 of FIG. 5), if the fitting and dense support materials are compatible, the tube would shrink down onto this fitting and bond to it. Metals may be particularly appropriate for this method. A schematic example of joining a tubular structure to an external object by cosintering is shown in FIG. 6, which shows a cross-section of the tubular device before and after sintering. Porous and dense metal support powders are molded into a tubular form. A dense electrolyte powder—YSZ powder in the example shown—overlays the porous support powder and part of the dense support powder. An external part, e.g., a manifold, fitting, fastener, seal, etc., is disposed inside the dense support. The entire structure is cosintered, densifying the dense support powder and bonding it to the fitting.

The methods described above allow high-temperature electrochemical devices to be sealed or joined to materials that are not compatible with the electrolyte.

EXAMPLES

The following examples are intended to illustrate various aspects of the invention, and do not limit the invention in any way.

Example 1

YSZ Electrolyte with Integrated Seal on Ferritic Stainless Steel Support

Figure 7:
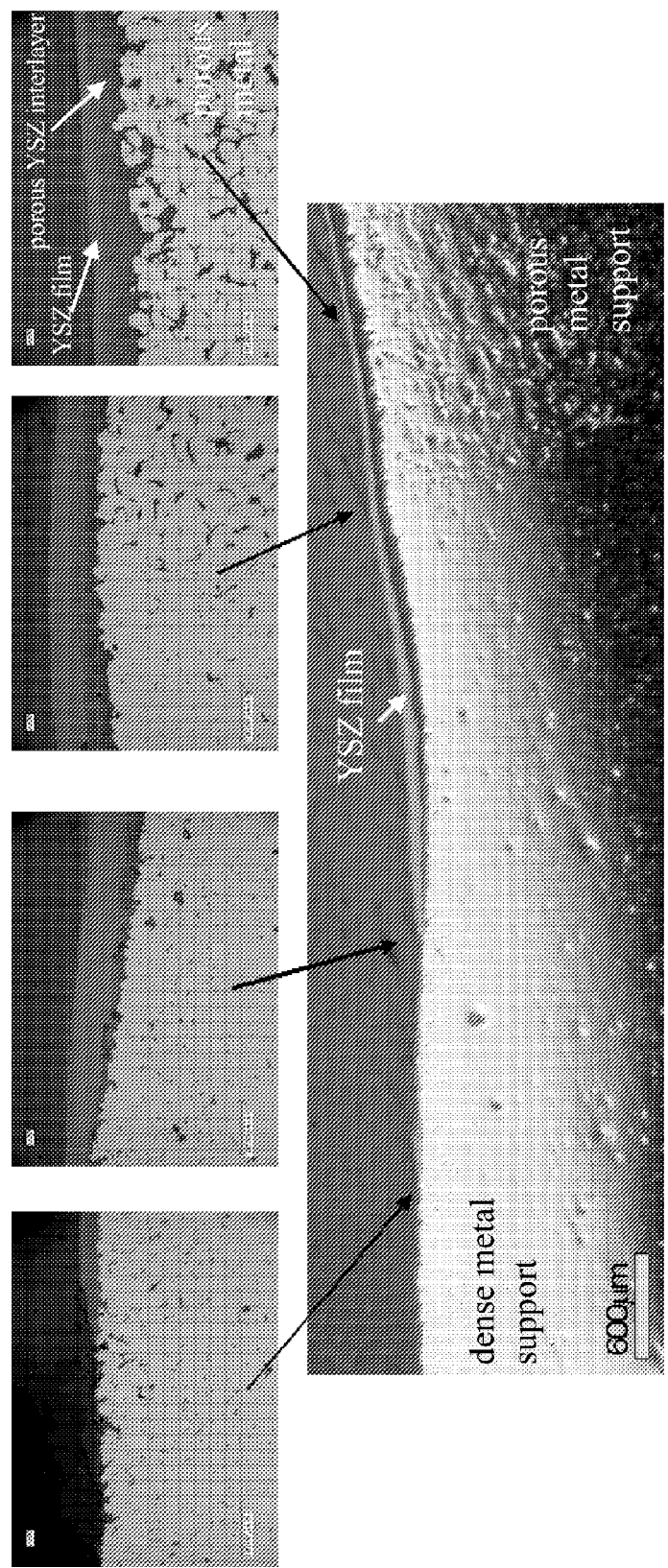
FIG. 7 shows images of a YSZ electrolyte film cosintered on a ferritic stainless steel support forming an integrated seal in accordance with certain embodiments of the present invention.

A thin, fully dense yttria-stabilized zirconia (YSZ) electrolyte layer was cosintered onto a ferritic stainless steel support. Cross-sectional images of the resulting structure are shown in FIG. 7. The particle size and green density of the support were chosen such that after sintering, the main body of the support was porous, whereas the end of the support sintered to near full density. The images show the end of the support as well as a small section of the main body. The YSZ cosintered to become a continuous dense layer that spanned the porous and dense parts of the metal support. Significant mechanical interlocking was achieved between the YSZ and dense metal, creating a hermetic seal at that interface. A porous YSZ interlayer was interposed between the dense YSZ film and the porous metal and a section of the dense metal support. This layer aided aerosol spray deposition of a smooth, continuous, thin YSZ film.

The structure shown in FIG. 7 was prepared according to the following method. Other methods for achieving a similar structure are within the scope of this invention.

1. Produce Metal Support Molding Powder

Water-atomized ferritic stainless steel particles were mixed with acrylic binder and polyethylene glycol 6000 poreformer, ground, and sieved to 150 µm agglomerates. The metal particles for the porous section of the support were 25-38 µm, and were mixed with 17 vol % binder and 59 vol % poreformer. These parameters were chosen so as to create a low green density compatible with retaining adequate porosity after cosintering. The metal particles for the dense section were <25 µm, and were mixed with 17 vol % binder and 26 vol % poreformer. These parameters were chosen to allow near-full density after cosintering, and a total shrinkage during cosintering that is similar to that of the YSZ film and porous metal support (~20-24% linear shrinkage).

2. Produce Metal Support Green Body

The metal support molding powder was loaded into a tubular mold such that only the end section of the tube contained the powder which was to become the dense section. The powder was compacted by cold isostatic pressing.

3. Deposit Interlayer (Optional)

After debiding and bisque-firing the metal support to create handling strength, the porous YSZ interlayer was deposited by dipcoating from a slurry of YSZ and acrylic performer particles.

4. Deposit YSZ Electrolyte Film

The electrolyte film was deposited by aerosol spraying onto the interlayer surface and exposed area of green dense support.

5. Cosinter

The entire structure was cosintered in reducing atmosphere at 1300° C. During this process all of the components shrank, the end of the support tube became dense, the electrolyte became dense, and the electrolyte and dense tube end were joined through mechanical interlocking to produce a hermetic (gas-tight) seal at that interface.

Example 2

Seal Quality Assessment

Several tubes with integrated seals were prepared according to the procedure outlined in Example 1. Stainless steel caps and manifolds were brazed onto the exposed dense metal tube ends. The electrolyte was not contacted by the braze. The hermeticity of the seal was then evaluated by bubble testing with 10 psi air inside the tube and acetone outside the tube. All integrated seal areas were air-tight.

Example 3

Addition of Cu to Stainless Steel Support

Two support specimens were prepared to demonstrate the effect of Cu addition to stainless steel support. The supports were prepared similarly to those in Example 1. The first comprised 10 g P434L 38-45 µm stainless steel powder, 2 g acrylic solution (15 wt % in water), 1.5 g acrylic poreformer beads (53-76 µm), and 0.5 g PEG6000. The second was identical except that 10 wt % of the stainless steel was replaced with Cu powder. Samples of both supports were sintered to 1100° C. and 1300° C. After sintering at 1100° C., the sample with Cu shrank 4.5%, whereas the sample with no Cu shrank 3.6%. The conductivity of the samples sintered at 1300° C. was measured in moist $H_2$ atmosphere. The sample with Cu provided 10.8 kS/cm, whereas the sample with no Cu provided 5.6 kS/cm. After sintering, a mixture of stainless steel-rich and Cu-rich regions of the Cu-containing support was observed, indicating incomplete alloying of the two phases.

From this example, it is clear that addition of a small amount of Cu to the stainless steel support can provide increased shrinkage at the initial stages of sintering, and improved conductivity of the final sintered support. The increased shrinkage may be used to improve the shrinkage match between the electrolyte film and the dense or porous support areas. The improved conductivity may improve in-plane conduction throughout the porous support, and is especially useful at the dense area of the support if the dense area is used as a contact to exchange current with the device. It is also expected that the ductility of the Cu will improve contact resistance and sealing, especially if the dense support area contains Cu and is forcibly contacted to the neighboring device, housing, current connection, etc.

Although the foregoing invention has been described in some detail for purposes of clarity of understanding, it will be apparent that certain changes and modifications may be practiced within the scope of the appended claims. It should be noted that there are many alternative ways of implementing both the process and compositions of the present invention. Accordingly, the present embodiments are to be considered as illustrative and not restrictive, and the invention is not to be limited to the details given herein.

The invention claimed is:

1. An electrochemical device structure, comprising:
    first and second electrodes separated by a dense electrolyte;
    a support comprising dense metal and porous metal support regions, wherein said dense metal and porous metal support regions share a dense support/porous support interface;
    the dense electrolyte disposed on at least a portion of the dense support region to form an electrolyte/dense support interface;
    the electrolyte/dense support interface and dense support/porous support interface forming a gas tight seal between the first electrode and the second electrode.

2. The electrochemical device structure of claim 1 wherein the metal is stainless steel.

3. The electrochemical device structure of claim 1 further comprising an external sealing member connected to the dense support region.

4. The electrochemical device structure of claim 3 wherein the external sealing member in not in physical contact with the dense electrolyte.

5. The electrochemical device structure of claim 3 wherein the external sealing member is disposed between the dense support and a metal housing or a manifold.

6. The electrochemical device structure of claim 3 wherein the dense support is fitted to a metal housing or member, wherein said housing or member is not in physical contact with the dense electrolyte.

7. The electrochemical device structure of claim 1 further comprising a ceramic or cermet interlayer disposed between the porous support region and the dense electrolyte.

8. The electrochemical device structure of claim 7 further wherein one of the porous electrodes comprises the interlayer.

9. The electrochemical device structure of claim 8 wherein the interlayer spans the dense support/porous support interface.

10. The electrochemical device structure of claim 8 wherein the interlayer is not in physical contact with the dense support region.

11. The electrochemical device structure of claim 1 the dense support/porous support interface comprises a graded pore structure.

12. The electrochemical device structure of claim 1 wherein the dense and porous support regions comprise the same material.

13. A method of fabricating an electrochemical device structure, said device structure comprising a support having dense metal and porous metal support regions and comprising at least one integrated gas-tight seal between an electrolyte and the dense metal support region, said method comprising:
    providing a support structure green body, said green body configured such that upon sintering, adjacent dense metal and porous metal support regions are formed;
    coating at least a portion of the support structure green body with a green electrolyte material; and
    cosintering the support structure green body and green electrolyte material such that the support having adjacent porous metal and dense metal support regions is formed, the dense metal support region and the electrolyte become substantially gas impermeable, and an integrated gas-tight seal is formed at an electrolyte/dense metal support region interface.

14. An electrochemical device structure, comprising:
    first and second electrodes separated by a dense electrolyte;
    a porous metal support region cosintered in contact with dense metal support region to form a gas impermeable dense support/porous support interface;
    the dense electrolyte cosintered in contact with at least a portion of the dense support region to form a gas impermeable electrolyte/dense support interface;
    the electrolyte/dense support interface and dense support/porous support interface forming a gas tight seal between the first electrode and the second electrode.

15. The electrochemical device structure of claim 14 further comprising an external sealing member connected to the dense support region.

16. The electrochemical device structure of claim 15 wherein the external sealing member in not in physical contact with the dense electrolyte.

17. The electrochemical device structure of claim 15 wherein the external sealing member is disposed between the dense support and a metal housing or a manifold.

18. The electrochemical device structure of claim 14 wherein the dense support is fitted to a metal housing or member, wherein said housing or member is not in physical contact with the dense electrolyte.

* * * * *